United States Patent [19]
Eldering

[11] Patent Number: 4,658,147
[45] Date of Patent: Apr. 14, 1987

[54] REMOTE OPTICALLY READABLE SYSTEM AND METHOD

[75] Inventor: Herman G. Eldering, Nutting Lake, Mass.

[73] Assignee: Baird Corporation, Bedford, Mass.

[21] Appl. No.: 719,719

[22] Filed: Apr. 3, 1985

[51] Int. Cl.[4] ............................................. G06K 7/10
[52] U.S. Cl. .................................... 250/566; 250/221; 235/462
[58] Field of Search .............. 250/556, 566, 568, 221; 356/328, 387; 340/347 P; 235/462

[56] References Cited

U.S. PATENT DOCUMENTS 4,211,486  7/1980  Magnussen, Jr. et al. .......... 356/228
4,302,681  11/1981  Woodsford et al. ................ 250/556

*Primary Examiner*—Eugene R. LaRoche
*Assistant Examiner*—Robert J. Pascal
*Attorney, Agent, or Firm*—Morse, Altman & Dacey

[57] ABSTRACT

An optically readable system and method to allow for the remote identification of people and/or objects is disclosed. The system includes a spectrally continuous source of radiation generating an interrogating beam, an optically readable device carried by a person or attached to an object and having a unique spectral signature and, generating a retroreflected beam when exposed to the interrogating beam, and an optical spectrum analyzer and decoder for identifying the unique spectral signature of the interrogated optically readable device and for transmitting the identifying information to a display and/or a computer input. The spectrally continuous source of radiation can comprise a tungsten filament lamp, a tunable laser or the like. If covert identification is desired, the source is operated to generate an interrogating beam in the infra-red spectrum only.

18 Claims, 8 Drawing Figures

REMOTE OPTICALLY READABLE SYSTEM AND METHOD

BACKGROUND OF THE INVENTION

1. Field of the Invention

The present invention relates generally to optically readable systems and, more particularly, to an optically readable system for the remote identification of persons and/or obJects.

2. The Prior Art

Remote reading systems have been in use for some years now. Most of them are easily compromised, however. Others suffer from a lack of reliability, particularly those that rely on spatially encoded techniques. In these spatially encoded systems, the presence of a smudge or piece of dirt may give a false reading or no reading at all, note the recent systems installed in our supermarkets. Also, at times it is desirable that identification be performed not only remotely but also covertly. There is thus room for improvements in this field.

SUMMARY OF THE INVENTION

It is a principal object of the present invention to overcome the above disadvantages by providing an optically readable system and method for the remote identification of people/and or objects. More specifically, it is an object of the present invention to provide a remote optically readable system and method to identify a person and/or an object provided with a codable optical device. The system essentially comprises a spectrally continuous source of radiation generating an interrogating beam, an optically readable device carried by a person or attached to an object and having a unique spectral signature and, upon exposure to the interrogating beam, generating a retroreflected beam, and an optical spectrum analyzer and decoder for identifying the unique spectral signature of the interrogated optically readable device and for transmitting the identifying information to a display and/or a computer input for further processing. The spectrally continuous source of radiation can comprise a tungsten filament lamp, a tunable laser or the like. The system is adaptable to covert identification by operating the spectrally continuous source of radiation so as to generate an interrogating beam in the infra-red spectrum only. The optically readable device is provided with means spectrally to select which wavelengths, encompassed within the interrogating beam, to include in the retroreflected beam and which wavelengths to remove therefrom. This spectral selection of wavelengths as per each device accounts for the unique spectral signature of that particular optically readable device, i.e., its individual code of identity. Preferably, the spectrally continuous source of radiation and the optical spectrum analyzer and decoder are mounted on the same, preferably movable platform so that they can scan for one or more of such optically readable devices, whether carried by people or attached to objects. The system is capable of optically reading, i.e., identifying, a plurality of such devices, each impressed with its own unique spectral signature, nearly simultaneously.

Other objects of the present invention will in part be obvious and will in part appear hereinafter.

The invention accordingly comprises the remote optically readable system and method of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENTS

Figure 1:
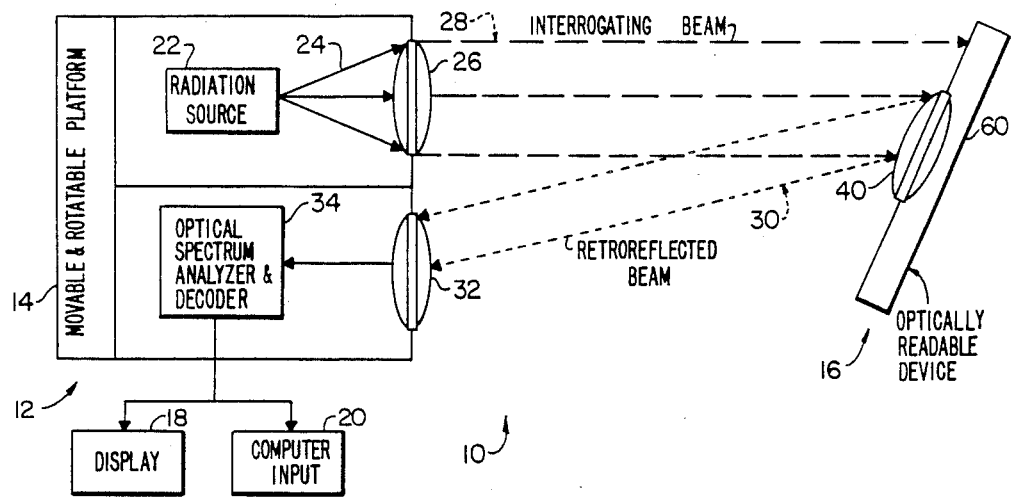
FIG. 1 is a schematic block diagram of a remote optically readable system constructed in accordance with the present invention.

In general, the illustrated embodiment of a remote optically readable system (RORS) 10 is designed to allow for the remote interrogation of the identity of a person or persons or an object or plurality of objects quickly, discreetly and efficiently. The remote optically readable system 10 essentially comprises an illuminator-interrogator means 12, preferably mounted on a movable and rotatable platform 14, an optically readable device 16 carried by a person or attached to an object, and a display 18 and/or a computer input terminal 20. Each optically readable device 16 has its own unique spectral signature. A person may carry one of such a device 16 or a plurality of such devices 16 on his person. If the latter, each device 16 can have the same spectral signature or each device 16 on his person can have a unique and different spectral signature. If an object, the same can be a document, a soft or hard material, such as a piece of cloth, cardboard, sheet of steel and the like, a container of goods, a vehicle, a railroad car or other similar object. Preferably, the optically readable device 16 is small, light in weight and is unobtrusive in appearance.

The illuminator-interrogator means 12 includes a spectrally continuous source 22 of radiation 24 containing a spectrum of wavelengths, optical means 26 for focusing and directing the radiation 24 as an interrogating beam 28 at an optically readable device 16, or at a plurality of such devices. Preferably, the spectrally continuous source 22 of radiation 24 is a collimated light source, such as a tungsten filament lamp, a xenon lamp, or a tunable laser.

The optically readable device 16, upon being exposed to the interrogating beam 28, generates a retroreflected beam 30 of radiation. This retroreflected beam 30 of radiation is spectrally encoded, in a manner as hereinbelow more fully described, with the mentioned unique spectral signature representative of that particular device 16. The optically readable device 16 is designed so as to return the retroreflected beam 30 of radiation to the illuminator-interrogator means 12, more specifically to a second optical means 32 thereof mounted in close proximity to and adjacent the first optical means 26.

The second optical means 32 will focus and direct the observed retroreflected beam 30 of radiation to an optical spectrum analyzer and decoder 34. The optical spectrum analyzer and decoder 34 in turn identifies the unique spectral signature of that particular device 16 and then transmits the identifying information, i.e., the identity code of that device 16, to a visual display 18 and/or to a computer input terminal 20 for further processing. The visual display 18 can comprise a plurality of L.E.D.'s or liquid crystals or the like. Computer processing is particularly useful when tracking a plurality of persons or a multiplicity of objects, each carrying its own optically readable device 16, such as for example, a number of railroad and freight cars in a railroad yard. There the RORS 10 is of great help in selecting the particular cars intended to constitute a particular train of cars destined for a particular location.

Figure 2:
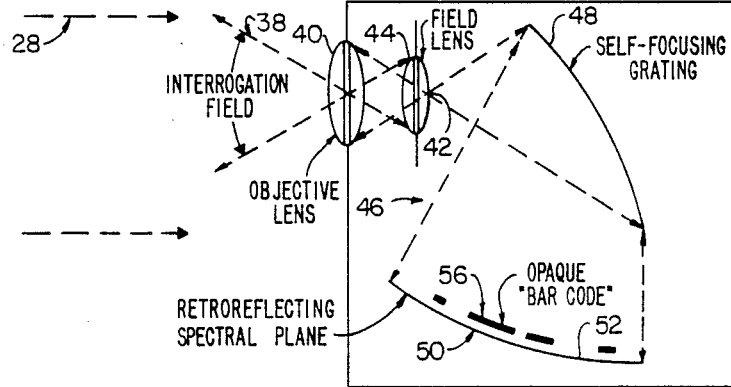
FIG. 2 is a schematic view, on an enlarged scale, of a part of the remote optically readable system of FIG. 1.
Figure 4:
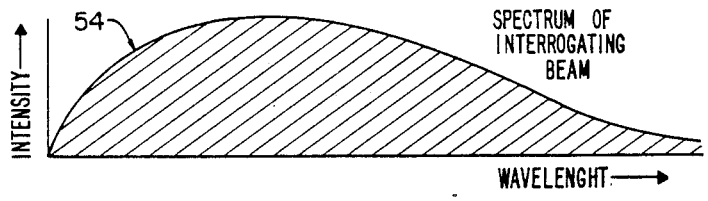
FIGS. 4–6 are diagrams helpful in understanding the principles of operation of the invention.
Figure 5:
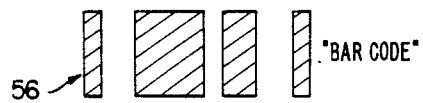

In FIG. 2, there is shown schematically one preferred construction of the optically readable device 16 of FIG. 1. The interrogating beam 28 of radiation, upon finding and locating the device 16, in particular its field of interrogation 38, is imaged by an obJective lens assembly 40 to a spot 42 on a field lens assembly 44. The spot 42 serves as a slit of a spectrometer 46 comprising a grating 48, which preferably is self-focusing, having a focal spectral plane 50 provided with a retroreflective surface 52. The grating 48 disperses and focuses the entering beam of radiation into a spectrum 54 (FIG. 4) on the focal plane 50, that is, on the retroreflective surface 52 thereof. The retroreflective surface 52 is designed to return the interrogating beam 28 as the retroreflected beam 30 in the same direction, returning it thereby to the interrogator-illuminator means 12, as above stated. An opaque bar code 56 (FIG. 5), preferably in the form of a tape, is attached to the focal spectral plane 50, that is, on the retroreflective surface 52 thereof. It is the function of this bar code 56 to remove selected segments of wavelengths of the spectrum 54 of the interrogating beam and to prevent these removed wavelengths segments from reaching the retroreflective surface 52. By so removing selected segments of wavelengths, as determined by the physical size and location of the bar code 56 on the surface 52, the bar code 56 impresses a unique spectral signature on that particular device 16. It must be understood that each device has a different sized and/or shaped bar code on its surface 52. It must also be pointed out that this identity information, representing the unique spectral signature for that particular device 16, is thus encoded spectrally and not spatially since the removed segments are wavelengths segments of the spectrum 54 of the incoming interrogating beam 28.

Figure 6:
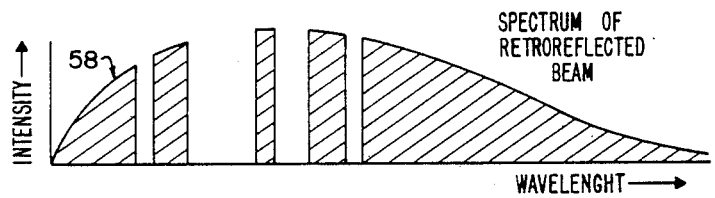

With the removal of these selected wavelengths segments from the spectrum 54 of the interrogating beam 28 before reaching the retroreflective surface 52, a spectrum 58 (FIG. 6) of the retroreflected beam 30 is generated. It is this spectrally encoded information, as represented by the spectrum 58, which is analyzed by and converted to the identity code of that device 16 by the optical spectrum analyzer and decoder 34.

The optically readable device 16 preferably is a small, light-weight, molded optical device, which preferably is conveniently housed in a plastic container 60 of suitable size and shape, depending on its use. To keep the device 16 as small as practicable, the grating 48 preferably is embossed on a thin plastic film, which is then secured within the container 60, together with the other above described parts.

Figure 7:
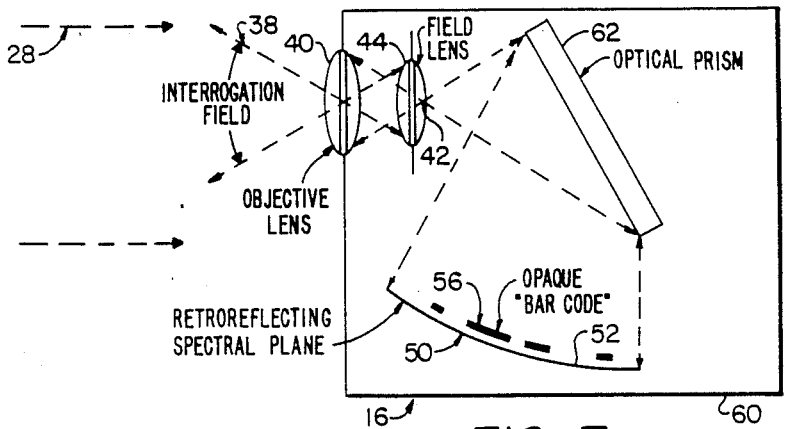
FIG. 7 is a view similar to FIG. 2 but showing a modification therein.

In FIG. 7 is shown an optically readable device 16 which is in all respects identical to the one shown in and described with reference to FIG. 2 with the exception that it employs an optical prism 62 in lieu of the grating 48 to disperse and focus the spectrum 54 of the interrogating beam on the surface 52 of the focal spectral plane 50.

Figure 3:
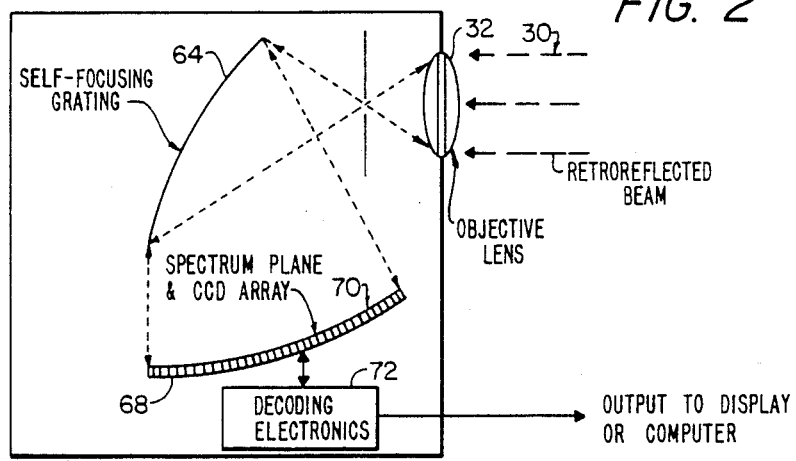
FIG. 3 is a schematic view, also on an enlarged scale, of another part of the remote optically readable system of FIG. 1.
Figure 8:
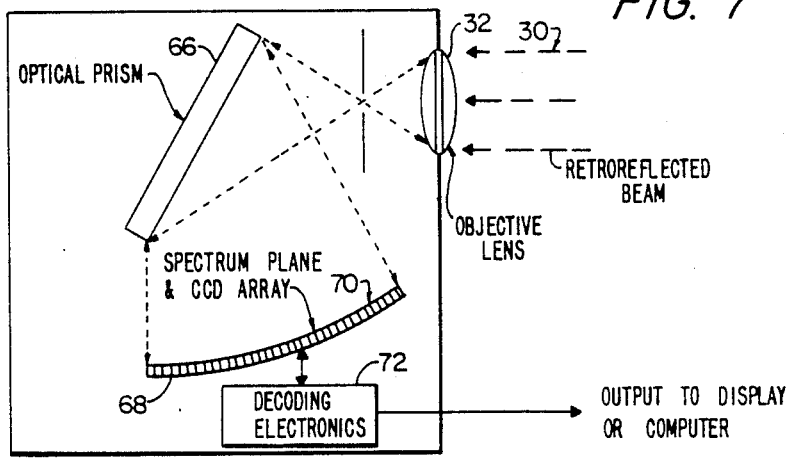
FIG. 8 is a view similar to FIG. 3 but showing a modification therein.

In FIGS. 3 and 8 are shown schematically the preferred two constructions of the optical spectrum analyzer and decoder assembly 34. The optical spectrum analyzer and decoder assembly 34 comprises a grating 64 (FIG. 3) or an optical prism 66 (FIG. 8) designed to disperse and focus the incoming retroreflected beam 30, focused thereat by the second optical means 32, into a spectrum on a focal plane 68 thereof. The focal plane 68 is provided with a plurality of charge coupled detectors (CCD) arranged in an array 70. In the alternative, a TV camera, not shown, can be located in the focal plane 68 in lieu of the CCD array 70. This CCD array 70 is coupled to a decoding electronics 72 which converts the unique spectral signature into an identity code for that particular optically readable device 16. The converted signal, such as a binary number representing the identity code, is then transmitted to the display 18 and/or to the computer input 20 for further processing.

The retroreflective surface 52 of the optically readable device 16 is such that it returns more radiation toward the illuminator-interrogator means 12 than does its diffuse plastic container's 60 surface. Consequently, the interrogating beam 28 can be wider than the diameter of the objective lens assembly 40 without significant dilution occurring in its unique spectral signature. Further and as already mentioned, whenever covert operation of the remote optically readable system 10 is desired, the spectrally continuous source 22 of radiation 24 will be set to emit in the infrared spectrum only.

Thus, what has been shown and described is a remote optically readable system 10 and method designed for the remote identification of people and/or objects, which system 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A process for remotely identifying people and/or objects comprising:
    (a) generating a beam of radiation representing a continuous spectrum;
    (b) directing said beam of radiation at a device having a unique spectral signature and provided with means of generating a retroreflected beam of radiation spectrally encoded with said unique spectral signature; and
    (c) analyzing and decoding said retroreflected beam of radiation;
    (d) said unique spectral signature comprising said retroreflected beam of radiation with certain wavelengths segments being removed therefrom.

2. The process of claim 1 wherein said beam of radiation comprises wavelengths in the infra-red spectrum only.

3. The process of claim 1 wherein said beam of radiation is a collimated beam.

4. The process of claim 1 wherein said device is carried by a person.

5. The process of claim 1 wherein said device is attached to an object.

6. The process of claim 1 further including the step of displaying said decoded retroreflected beam of radiation in the form of an identifying information.

7. The process of claim 1 further including the step of transmitting said decoded retroreflected beam of radiation to a computer for further processing.

8. The process of claim 1 wherein said beam of radiation is generated by a tunable laser.

9. An optically readable system for the remote identification of persons and/or objects comprising:
  (a) means for generating and directing an interrogating beam of radiation representing a continuous spectrum;
  (b) an optically readable device carried by a person or attached to an object and having a unique spectral signature;
  (c) means included in said device for generating a retroreflected beam encoded with said unique spectral signature when said device is exposed to said interrogating beam of radiation; and
  (d) an optical spectrum analyzer and an electronic decoder for converting said unique spectral singature into a code of identity;
  (e) said means for generating said retroreflected beam encoded with said unique spectral signature comprising means for dispersing and focusing said interrogating beam of radiation on a focal plane within said device, said focal plane including a retroreflective surface, and means for removing specific selected wavelengths of said interrogating beam of radiation before generating said retroreflected beam, encoding thereby said retroreflected beam with said unique spectral signature.

10. The optically readable system of claim 9 wherein said interrogating beam of radiation comprises wavelengths in the infra-red spectrum only.

11. The optically readable system of claim 9 wherein said means for generating said interrogating beam of radiation is one of a group comprising a tungsten filament lamp and a xenon lamp.

12. The optically readable system of claim 9 wherein said means for generating said interrogating beam of radiation is a tunable laser.

13. The optically readable system of claim 9 wherein said means for dispersing and focusing said interrogating beam of radiation comprises a self-focusing grating of a spectrometer, said focal plane is the focal plane of said spectrometer, and said means for removing specific selected wavelengths is an opaque bar code in the form of a tape attached to said focal plane.

14. The optically readable system of claim 9 wherein said optical spectrum analyzer comprises a self-focusing grating of a spectrometer having a spectrum plane, and a plurality of charge coupled detectors arranged in an array at said spectrum plane.

15. The optically readable system of claim 14 wherein said electronic decoder comprises decoder electronics coupled to said array of charge coupled detectors for converting said unique spectral signature into said code of identity in a form visually to appear on a display.

16. The optically readable system of claim 9 further including a display, wherein said optical spectrum analyzer comprises a prism with a spectrum plane and a plurality of CCDs arranged in an array at said plane.

17. The optically readable system of claim 13 wherein said self-focusing grating comprises an embossed plastic tape secured within said device.

18. The optically readable system of claim 9 wherein said means for generating and directing said interrogating beam of radiation is mounted on a movable and rotatable platform, and wherein said means for generating said retroreflected beam includes an optical prism.

* * * * *